United States Patent [19]

Terashima et al.

[11] Patent Number: 5,465,242

[45] Date of Patent: Nov. 7, 1995

[54] OPTICAL DISK DEVICE

[75] Inventors: Yugi Terashima; Shogo Horinouchi; Hiroyuki Matsuba, all of Fukuoka, Japan

[73] Assignee: Matsushita Electric Industrial Co., Ltd., Osaka, Japan

[21] Appl. No.: 227,709

[22] Filed: Apr. 14, 1994

Related U.S. Application Data

[63] Continuation of Ser. No. 16,193, Feb. 11, 1993, abandoned, which is a continuation of Ser. No. 754,802, Sep. 4, 1991, abandoned.

[30] Foreign Application Priority Data

Sep. 4, 1990 [JP] Japan ................................. 2-234908

[51] Int. Cl.⁶ ..................................................... G11B 7/12
[52] U.S. Cl. ........................ 369/44.19; 369/44.21; 369/44.14; 369/44.12; 369/112; 359/814
[58] Field of Search ............................ 369/44.14, 44.12, 369/44.11, 44.17, 44.19, 44.21, 44.22, 44.28, 112; 359/814, 824; 360/106, 78.05; 310/12–14; 318/135

[56] References Cited

U.S. PATENT DOCUMENTS

| | | | |
|---|---|---|---|
| 4,571,026 | 2/1986 | Maruta | 369/44.21 |
| 4,669,073 | 5/1987 | Wakabayashi et al. | 369/44.19 |
| 4,678,276 | 7/1987 | Sekimoto et al. | 359/814 |
| 4,687,296 | 8/1987 | Terayama et al. | 369/44.19 |
| 4,796,248 | 1/1989 | Ozaki et al. | 369/44.21 |
| 4,998,802 | 3/1991 | Kasuga et al. | 359/814 |
| 5,140,471 | 8/1992 | Kasahara | 369/44.14 |

FOREIGN PATENT DOCUMENTS

| | | | |
|---|---|---|---|
| 57-189354 | 11/1982 | Japan . | |
| 1-182939 | 7/1989 | Japan | 369/44.21 |
| 1-273233 | 11/1989 | Japan . | |
| 2129186 | 5/1984 | United Kingdom | 360/106 |

*Primary Examiner*—Scott J. Sugarman
*Assistant Examiner*—Muhammad N. Edun
*Attorney, Agent, or Firm*—Lowe, Price, LeBlanc & Becker

[57] ABSTRACT

An optical disk device for use as a mass storage device includes an axially and angularly movable support mounted on a hollow shaft and supporting a condensing lens that converges a laser beam onto an optical disk mounted in position. A substantially cylindrical side yoke is disposed concentrically around the hollow shaft, and a magnet is coupled to said side yoke, the magnet and the side yoke jointly providing a magnetic circuit. A tracking coil is mounted on the support, the side yoke extending through the tracking coil in magnetically coacting relationship to the magnetic circuit. When an electric current flows through the tracking coil, the support and hence the condensing lens are angularly moved in a wide angular range about shaft to access a desired track on the optical disk. The condensing lens is disposed off the shaft, but is spaced from the shaft by a relatively small distance. Therefore, the moment of inertia of the support with the condensing lens supported thereon is relatively small for quick tracking control and short track access time.

13 Claims, 8 Drawing Sheets

OPTICAL DISK DEVICE

This application is a continuation of application Ser. No. 08/016,193 filed Feb. 11, 1993, now abandoned, which is a continuation of application Ser. No. 07/754,802, filed Sep. 4, 1991, now abandoned.

BACKGROUND OF THE INVENTION

1. Field of the Invention

The present invention relates to an optical disk device for use as an external mass storage unit for a computer or the like.

2. Description of the Prior Art

One conventional optical disk device is shown in FIGS. 9 through 12 of the accompanying drawings.

FIG. 9 shows the conventional optical disk device in exploded perspective. The optical disk device has an optical disk 40 that can be rotated about its own axis by a spindle motor 41 mounted on a support base 46. A laser beam for recording and reading desired data is converged onto a recording layer on the optical disk 40 by a condensing lens 42. The condensing lens 42 is supported by a swing actuator 43 that roughly positions the condensing lens 42 radially with respect to the optical disk 40 for tracking purpose. The swing actuator 43 is mounted on the support base 46 for angular about a swing axis 44 that is positioned radially outwardly of the optical disk 40. An optical head assembly 45, which is also mounted on the base 46, houses a semiconductor laser, optical components such as prisms and mirrors, and sensors for detecting tracking and focusing errors. A laser beam emitted by the semiconductor laser is guided from the optical head assembly 45 to the condensing lens 42 by a rhomboid prism 47. The condensing lens 42 is supported on an assembly of four springs 48 and can be moved toward and away from the optical disk 40 by a focusing actuator 49 composed of a coil for focusing purpose.

FIG. 10 shows the swing actuator 43 in greater detail. The swing actuator 43 has a pair of magnetic yokes 50a, 50b and a pair of permanent magnets 51, 52 disposed vertically between the magnetic yokes 50a, 50b, the permanent magnets 51, 52 being magnetized such that the permanent magnet 51 has an N pole on its upper surface and the permanent magnet 52 has an S pole on its upper surface. Although not shown, the swing actuator 43 also has another pair of permanent magnets disposed between the magnetic yokes 50a, 50b and positioned in diametrically opposite relationship to the permanent magnets 51, 52 across the axis 44. A swing arm 53 made of a nonmagnetic light metal such as aluminum is also disposed between the magnetic yokes a, 50b and supports a pair of coils 54 thereon.

The permanent magnets 51, 52 form a magnetic circuit as follows: A magnetic line 51a of force leaving the N pole of the permanent magnet 51 passes through the magnetic yoke 50b, and then reaches the S pole of the permanent magnet 52 as indicated by the arrow 52a. Then, the magnetic line 52a of force passes through the magnetic yoke 50a and reaches the N pole of the permanent magnet 51 again. When an electric current flows though the coil 54 in direction indicated by the arrow 55, the swing arm 53 is angularly displaced about the axis 44 in the direction indicated by the arrow 56, thereby moving the condensing lens 42 in the radial direction indicated by the arrow T with respect to the optical disk 40. Since the swing arm 53 has a large moment of inertia, however, the swing arm 53 itself is unable to provide a sensitivity that is high enough to follow the high-speed rotation of the optical disk 40. To avoid this drawback, a galvanometer mirror 58 (see FIG. 11) having a sufficiently small moment of inertia is disposed in a path 57 of the laser beam and angularly moved in the direction indicated by the arrow 59 to swing the laser beam from the condensing lens 42 as indicated by the arrows 60 for highly accurate and sensitive tracking control. Stated otherwise, the condensing lens 42 is positioned by the swing arm 53 for rough tracking control, and the galvanometer mirror 58 is angularly moved for highly accurate and sensitive tracking control.

The condensing lens 42 is actuated to focus the laser beam onto the optical disk 40 in the manner described below. As shown in FIG. 10, a lens holder 61 which supports the condensing lens 42, and the focusing actuator 49 has a focusing coil 62 that is supported on the swing arm 53 through the leaf springs 48. The focusing coil 62 is of a U shape straddling a magnetic yoke 63 (see also FIG. 11). The magnetic yoke 63 is integral with a magnetic yoke 64 (see FIG. 10), the magnetic yokes 63, 64 being jointly of a U-shaped cross section. A permanent magnet 65 is fixed to an inner side surface of the magnetic yoke 64 which faces the magnetic yoke 63. The permanent magnet 65 has an N pole on its surface facing the magnetic yoke 63 and an S pole on its surface facing the magnetic yoke 64. When an electric current flows through the focusing coil 62 in the direction indicated by the arrow 66, since a magnetic line 67 of force is directed as shown, a force is imposed on the focusing coil 62 in the direction indicated by the arrow 68 according to the Fleming's left-hand rule. The condensing lens 42 can be moved in the direction indicated by the arrow F by controlling the direction in which the electric current flows through the focusing coil 62.

The conventional optical disk device shown in FIGS. 9 through 11 have suffered from the following problems: Since the swing arm 53 and the galvanometer mirror 58 need to be controlled for tracking control and the condensing lens 42 needs to be controlled for focusing control, the control system of the optical disk device is relatively complex. The large moment of inertia of the swing arm 53 requires a powerful magnetic circuit for angularly moving the swing arm 53 at high speed for tracking control. Therefore, the magnetic circuit consumes a relatively large amount of electric energy. The optical disk device is relatively complex in structure, and cannot be reduced in size and weight.

FIG. 12 fragmentarily shows, in exploded perspective, another conventional condensing lens assembly. A laser beam reflected by a reflecting mirror 69 is converged by a condensing lens 70 that is supported on a cylindrical lens holder 71. The lens holder 71 is axially slidably and angularly movably supported on a support shaft 73 that is vertically fixed to a base 72 parallel to the optical axis of the condensing lens 70. A focusing coil 74 is wound around the lens holder 71. A pair of tracking coils 75 is mounted on the outer circumferential surface of the lens holder 71 in diametrically opposite relationship to each other. A pair of diametrically opposite focusing permanent magnets 76 and a pair of diametrically opposite tracking permanent magnets 77 are disposed on the base 72 for magnetic coaction with the focusing coil 74 and the tracking coils 75, respectively. Each of the tracking coils 75 is spirally wound in a rectangular shape having four sides. When the tracking coils 75 are supplied with an electric current, they develop tracking forces in combination with the tracking permanent magnets 77. According to the Fleming's left-hand rule, only one side (effective side) of each of the rectangular tracking coils 75 which extends parallel to the support shaft 73 is effective for coaction with the tracking forces. However, the electric current that passes through the other side (ineffective side) of each of the rectangular tracking coils 75 flows in a direction opposite to the direction of the electric current through the effective side. When the ineffective sides of the focusing coils 75 are subject to magnetic forces from the tracking permanent magnets 77, they tend to eliminate the tracking forces. More specifically, when the sides of the tracking coils 75 that extend parallel to the support shaft 73 undergo the same magnetic forces, no tracking forces are developed.

In FIG. 12, the angular movement of the lens holder 71 is limited by the layout of tracking permanent magnets 77 and tracking coils 75, and the lens holder 71 and hence the condensing lens 70 cannot be angularly moved beyond 90°.

SUMMARY OF THE INVENTION

It is an object of the present invention to provide an optical disk device that has an optical pickup that is angularly movable in a wide angular range for tracking control, and also has a condensing lens that is spaced from the center of angular movement thereof by a relatively small distance, so that the optical pickup has a small moment of inertia for high-speed tracking movement and short track access time.

According to the present invention, there is provided an optical disk device comprising a shaft, a support mounted on the shaft for axial movement therealong and angular movement therearound, condensing means for converging a light beam onto an optical disk mounted in position, the condensing means being supported on the support off the shaft, a substantially cylindrical side yoke disposed concentrically around the shaft, a magnet coupled to the side yoke, the magnet and the side yoke jointly providing a magnetic circuit, and a tracking coil mounted on the support, the side yoke extending through the tracking coil in magnetically coacting relationship to the magnetic circuit. The tracking coil has a central axis extending tangentially to a circle around the shaft.

The optical disk device may also include a substantially cylindrical central yoke disposed concentrically around the shaft, the central yoke, the magnet, and the side yoke jointly providing the magnetic circuit.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
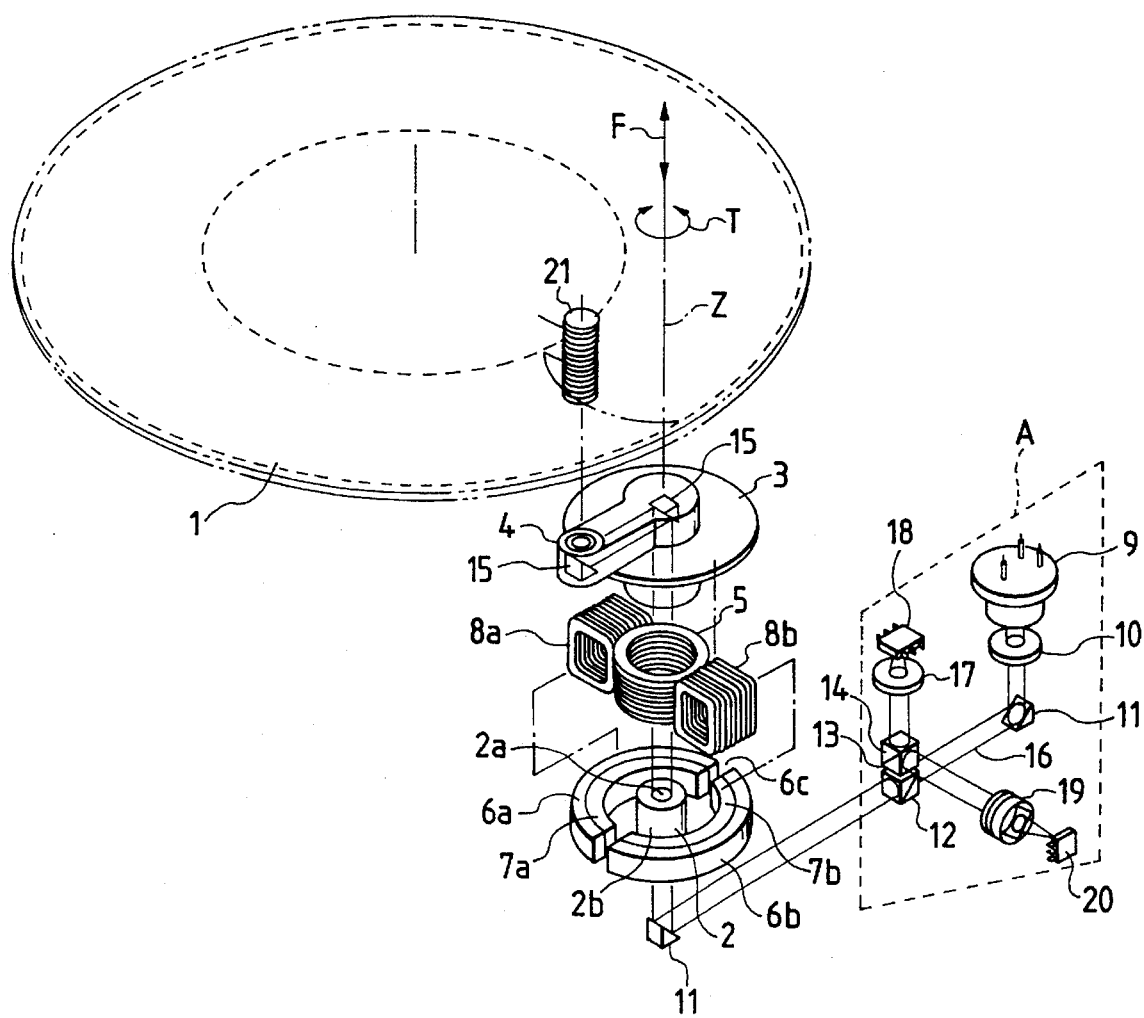
FIG. 1 is an exploded perspective view of an optical disk device according to an embodiment of the present invention.

FIG. 1 shows an optical disk device according to an embodiment of the present invention. The optical disk device is shown as being a magneto-optic disk device, and has an optical disk 1 rotatable about its own central axis. A hollow shaft 2 of a ferromagnetic material is vertically disposed in the optical disk device. The hollow shaft 2 has a central throughhole 2a providing a light path and an outer peripheral wall 2b ground and coated with a Teflon layer or the like.

A circular support 3 of a nonmagnetic material is slidably and angularly movably supported on the hollow shaft 2 coaxially therewith on one side of the optical disk 1. The circular support 3 on the hollow shaft 2 is axially slidable along an Z-axis in the direction indicated by the arrow F for focusing control, and also angularly movable about the Z-axis in the direction indicated by the arrow T. The circular support 3 supports thereon a condensing lens 4 at a position offset from the Z-axis. The condensing lens 4 is spaced from the Z-axis by a relatively small distance. On the circular support 3, there is also mounted a cylindrical focusing coil 5 disposed around and facing the hollow shaft 2 that magnetically serves as a central yoke. The cylindrical focusing coil 5 is positioned underneath the circular support 3. A substantially cylindrical side yoke, which is composed of a pair of arcuate side yoke members 6a, 6b that are spaced from each other by a gap 6c, is disposed around the hollow shaft 2 in radially outwardly spaced relationship thereto, the side yoke members 6a, 6b being made of a ferromagnetic material. A substantially cylindrical permanent magnet is composed of a pair of permanent magnet members 7a, 7b that are attached to the respective inner surfaces of the side yoke members 6a, 6b, with the hollow shaft 2 and the side yoke members 6a, 6b jointly forming a magnetic circuit. The side yoke members 6a, 6b and the permanent magnet members 7a, 7b are disposed concentrically around the hollow shaft 2. Tracking coil members 8a, 8b, each spirally wound in a rectangular shape, are mounted on the circular support 3 one on each side of the focusing coil 5. The tracking coil members 8a, 8b, which are electrically connected to each other, jointly provide a tracking coil that is disposed around the respective side yoke members 6a, 6b.

The optical disk device shown in FIG. 1 also has an optical system generally designated by the reference numeral A. The optical system A has a semiconductor laser 9 for emitting a laser beam, a collimator lens 10, a pair of reflecting mirrors 11, a beam splitter 12, a ½ λ plate 13, and a polarizer beam splitter 14. One of the reflecting mirrors 11 is disposed in the hollow shaft 2. The optical system A also includes a pair of reflecting mirrors 15 disposed in the circular support 3 for movement therewith. A laser beam 16 that is emitted from the semiconductor laser 9 is converted into a parallel beam by the collimator lens 10. Then, the laser beam 16 is reflected by one of the reflecting mirrors 11, passes through the beam splitter 12, is reflected by the other reflecting mirror 11, travels through the hollow shaft 2, and is reflected by the reflecting mirrors 15 thereby to travel through the condensing lens 4, by which it is converged onto a recording surface of the optical disk 1. When the laser beam 16 travels from the beam splitter 12 to the other reflecting mirror 11, the laser beam 16 passes through the gap 6c between the side yoke members 6a, 6b and also an aperture 2c (see FIG. 3) defined in the hollow shaft 2. Such an arrangement is effective to reduce the height of the optical disk device.

A laser beam reflected by the recording surface of the optical disk 1 travels through the condensing lens 4, the reflecting mirrors 11, the beam splitter 12, and the ½ λ plate 13, and is divided into a P-wave component and an S-wave component by the polarizer beam splitter 14. The P-wave component is converged onto a sensor 18 by a condensing lens 17, whereas the S-wave component is converged onto a sensor 20 by an astigmatic lens 19. The astigmatic lens 19 is used to detect a focus error. A signal produced by the sensor 18 is used to detect a tracking error in the radial push-pull method. A readout signal from the optical disk 1 is obtained as a differential output signal derived from the output signals from the sensors 18, 20.

An electromagnet 21 is disposed on the other side of the optical disk 1 remotely from the circular support 3. The electromagnet 21 serves to produce an external magnetic field that determines the direction in which the recording layer of the optical disk 1 is to be magnetized when desired data are to be recorded therein.

Figure 2:
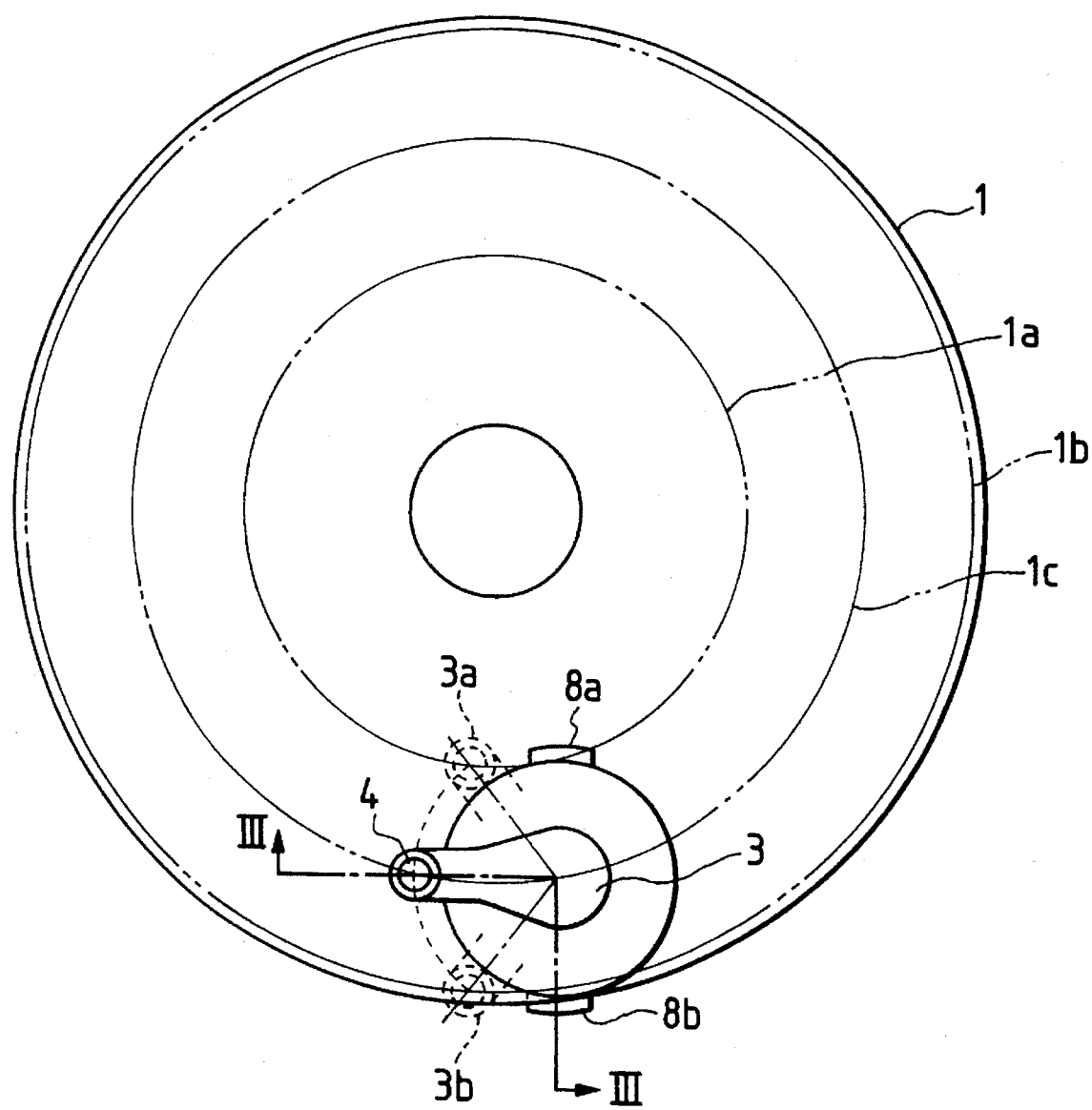
FIG. 2 is a plan view of the optical disk device shown in FIG. 1.

FIG. 2 shows in plan the optical disk device shown in FIG. 1. The optical system A is omitted from illustration in FIG. 2. The optical disk 1 has circular tracks that include an innermost track 1a, an outermost track 1b, and a substantially intermediate track 1c between the innermost and outermost tracks 1a, 1b. The axis Z of the circular support 3, i.e., the hollow shaft 2, is positioned near the intermediate track 1c. When the circular support 3 is angularly moved to access the innermost track 1a, the condensing lens 4 is located in a position indicated by the broken lines 3a. When the circular support 3 is angularly moved to access the outermost track 1b, the condensing lens 4 is located in a position indicated by the broken lines 3b.

Figure 3:
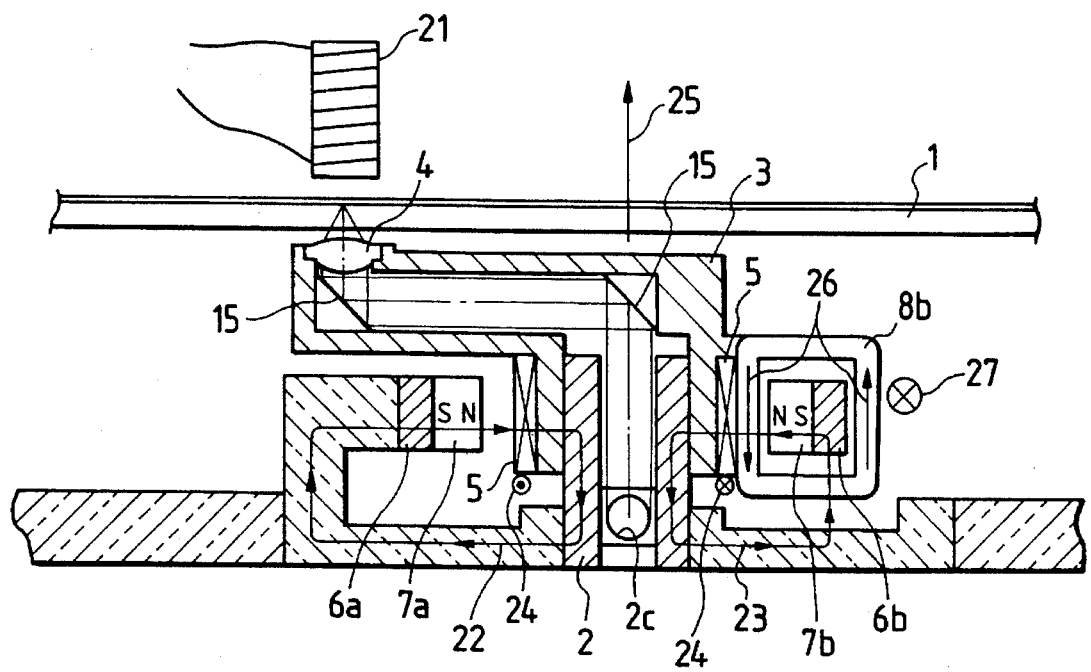
FIG. 3 is an enlarged cross-sectional view taken along line III—III of FIG. 2.

FIG. 3 illustrates a magnetic actuator for actuating the circular support 3 and hence the condensing lens 4, the magnetic actuator being composed of the focusing coil 5, the side yoke members 6a, 6b, the permanent magnet members 7a, 7b, and the tracking coil members 8a, 8b. The permanent magnet members 7a, 7b comprise respective arcuate permanent magnets each having a S pole on its outer peripheral surface and a N pole on its inner peripheral surface. The outer peripheral surfaces of the permanent magnet members 7a, 7b are secured to the respective side yoke members 6a, 6b by an adhesive or the like. The permanent magnet members 7a, 7b, the side yoke members 6a, 6b, and the hollow shaft 2 jointly form magnetic circuits 22, 23. When an electric current flows through the focusing coil 5 in the direction indicated by the arrow 24 oriented perpendicularly to the sheet of FIG. 3 toward the observer of FIG. 3, the focusing coil 5 is subjected to a force produced in the direction indicated by the arrow 25 for focusing control. Therefore, the condensing lens 4 is moved toward the optical disk 1 for thereby focusing the laser beam applied therefrom onto the recording layer of the optical disk 1. When an electric current flows through the tracking coil member 8b placed in the magnetic circuit 23 in the direction indicated by the arrow 26, the tracking coil member 8b is subjected to a force produced in the direction indicated by the arrow 27 oriented perpendicularly to the sheet of FIG. 3 away from the observer of FIG. 3. Although not shown in FIG. 3, the tracking coil member 8a that is also supplied with the electric current is subjected to a force produced in the direction oriented perpendicularly to the sheet of FIG. 3 toward the observer of FIG. 3. Consequently, the circular support 3 and hence the condensing lens 4 are angularly moved about the axis Z to access a desired track on the recording layer of the optical disk 1.

Figure 4:
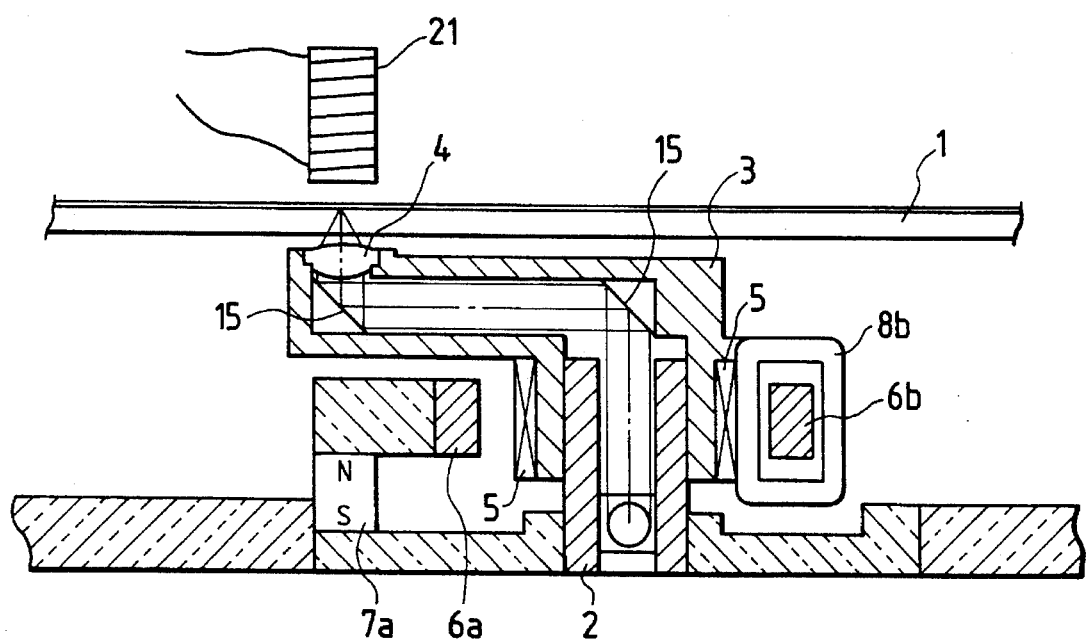
FIG. 4 is an enlarged cross-sectional view of a modification of the optical disk device shown in FIG. 3.

In FIG. 3, the side yoke members 6a, 6b are supported on a device housing with the permanent magnet members 7a, 7b attached to the respective side yoke members 6a, 6b, and the side yoke members 6a, 6b and the permanent magnet members 7a, 7b are positioned in the tracking coil members 8a, 8b. According to a modification shown in FIG. 4, the permanent magnet members 7a, 7b (only one shown) are supported on a device housing, and the only side yoke members 6a, 6b are positioned in the respective tracking coil members 8a, 8b (only one shown). In FIG. 4, the permanent magnet members 7a, 7b, the side yoke members 6a, 6b, and the hollow shaft 2 jointly form magnetic circuits, in which the focusing coil 5 and the tracking coil members 8a, 8b are disposed.

FIGS. 5 through 8 show an optical disk device according to another embodiment of the present invention. The optical disk device shown in FIG. 5 has an optical disk 1, a circular support 3 of a nonmagnetic material, a condensing lens 4, a pair of side yoke members 6a, 6b of a ferromagnetic material, and a pair of permanent magnet members 7a, 7b. These components are identical to the corresponding components of the optical disk device shown in FIGS. 1 through 4, and will not be described in detail below. A hollow shaft 32 with a central hole 2a and an aperture 32a (FIG. 7) is vertically disposed beneath the optical disk 1. A substantially cylindrical central yoke, which is composed of a pair of circular central yoke members 35a, 35b of a ferromagnetic material, is disposed concentrically around the hollow shaft 32. The side yoke members 6a, 6b are disposed concentrically around the central yoke members 35a, 35b, and the permanent magnet members 7a, 7b are attached to the inner peripheral surfaces of the side yoke members 6a, 6b, respectively, such that the central yoke members 35a, 35b and the side yoke members 6a, 6b jointly form a magnetic circuit. The permanent magnet members 7a, 7b and the side yoke members 6a, 6b are disposed concentrically around the hollow shaft 32 and the central yoke members 35a, 35b. On the circular support 3, there are mounted a pair of tracking coil members 38a, 38b each spirally wound in a rectangular shape and disposed around the central yoke members 35a, 35b, respectively, and a focusing coil 39 disposed concentrically around the hollow shaft 32 and radially positioned between the central yoke members 35a, 35b and the permanent magnet members 7a, 7b. The tracking coil members 38a, 38b and the focusing coil 39 are located in a radial gap between the central yoke members 35a, 35b and the side yoke members 6a, 6b.

Figure 5:
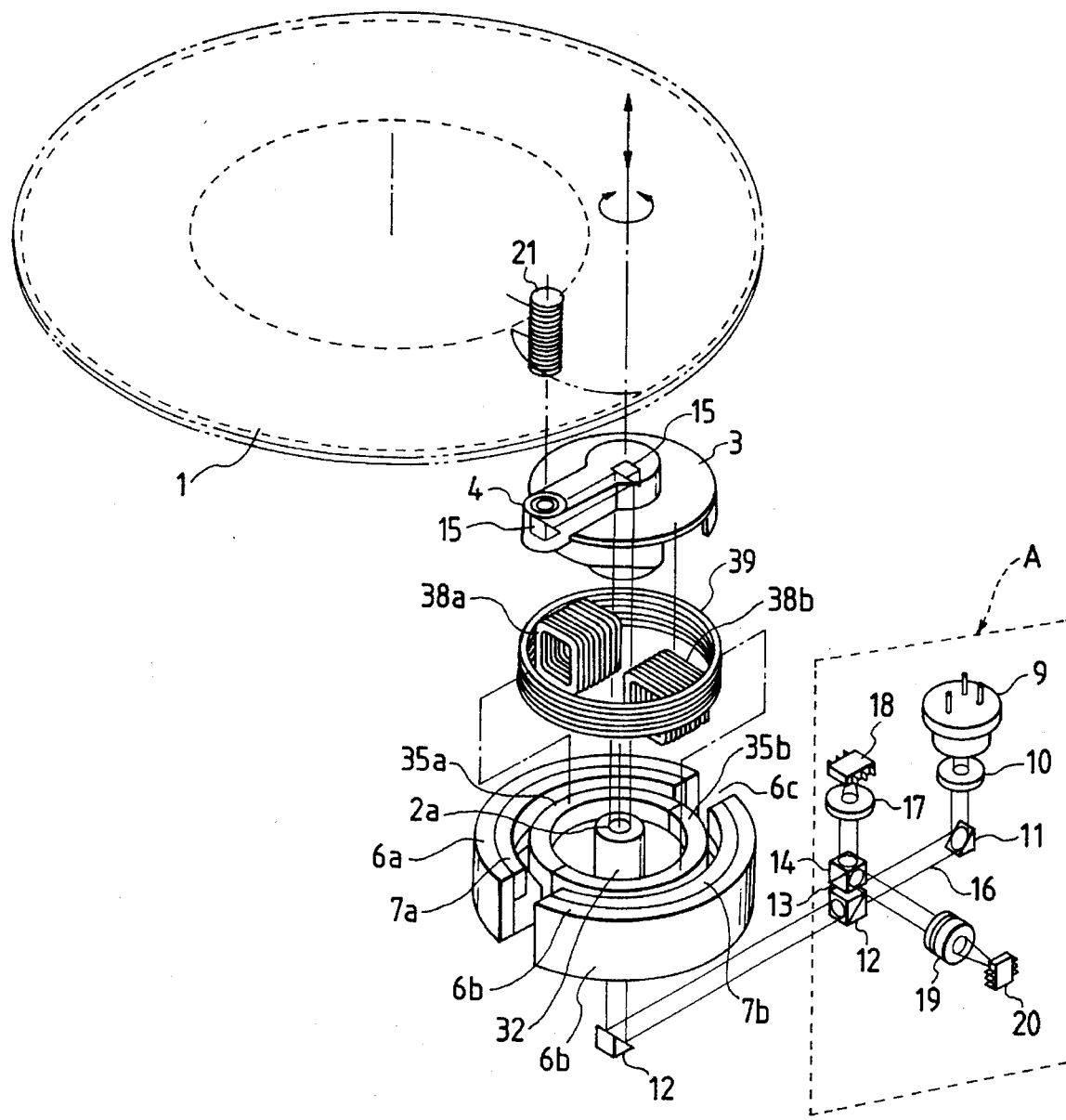
FIG. 5 is an exploded perspective view of an optical disk device according to another embodiment of the present invention.

The optical disk device shown in FIG. 5 also has an optical system A that is identical to the optical system shown in FIG. 1. Therefore, the optical system A shown in FIG. 5 will not be described in detail below.

Figure 6:
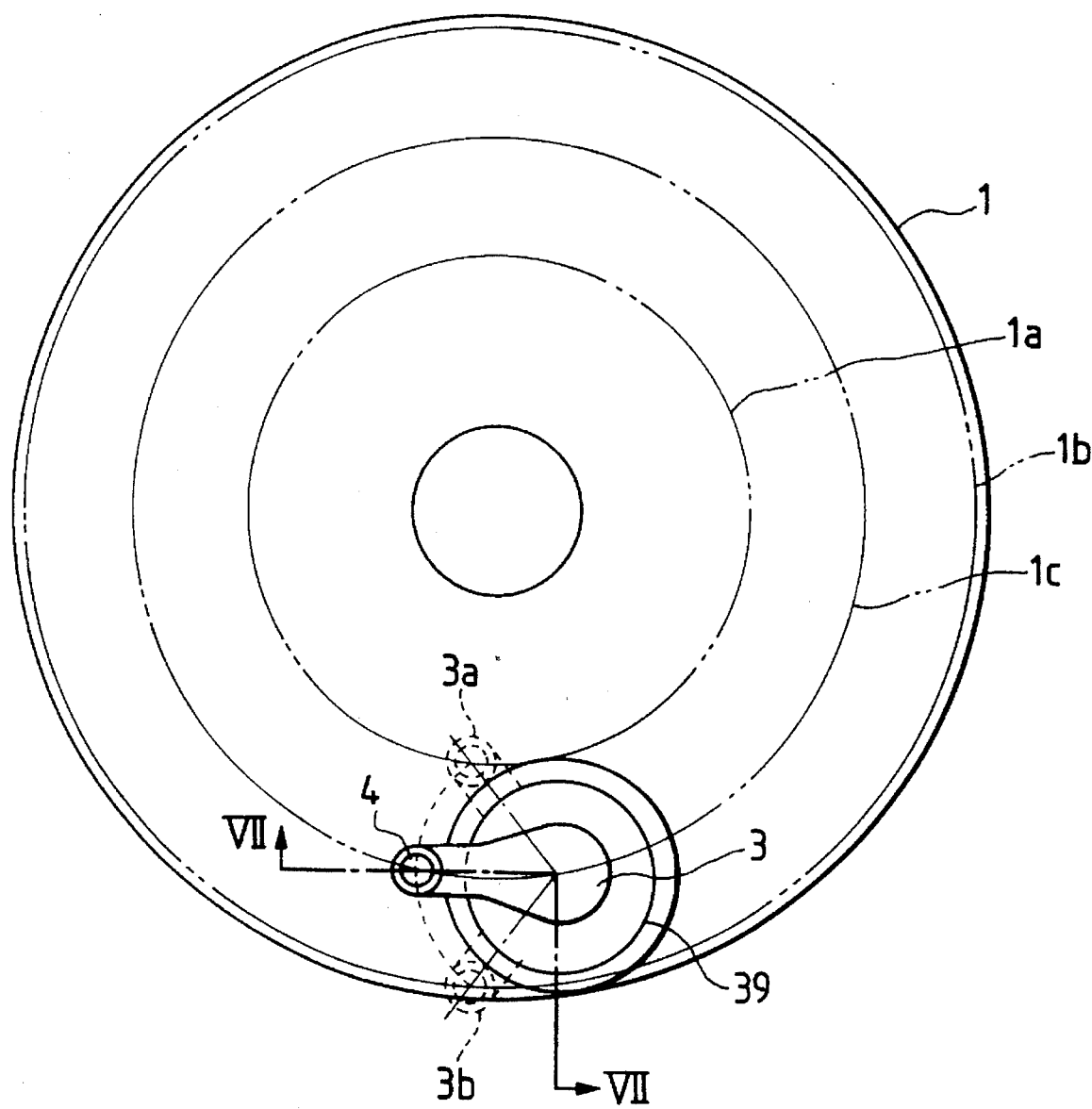
FIG. 6 is a plan view of the optical disk device shown in FIG. 5.

FIG. 6 shows in plan the optical device illustrated in FIG. 5.

As shown in FIG. 6, the optical disk 1 has tracks including innermost, outermost, and intermediate tracks 1a, 1b, 1c. The condensing lens 4 is angularly movable between positions 3a, 3b for tracking control in response to angular movement of the circular support 3. The focusing coil 39 is disposed at the outer circumference of the circular support 3.

Figure 7:
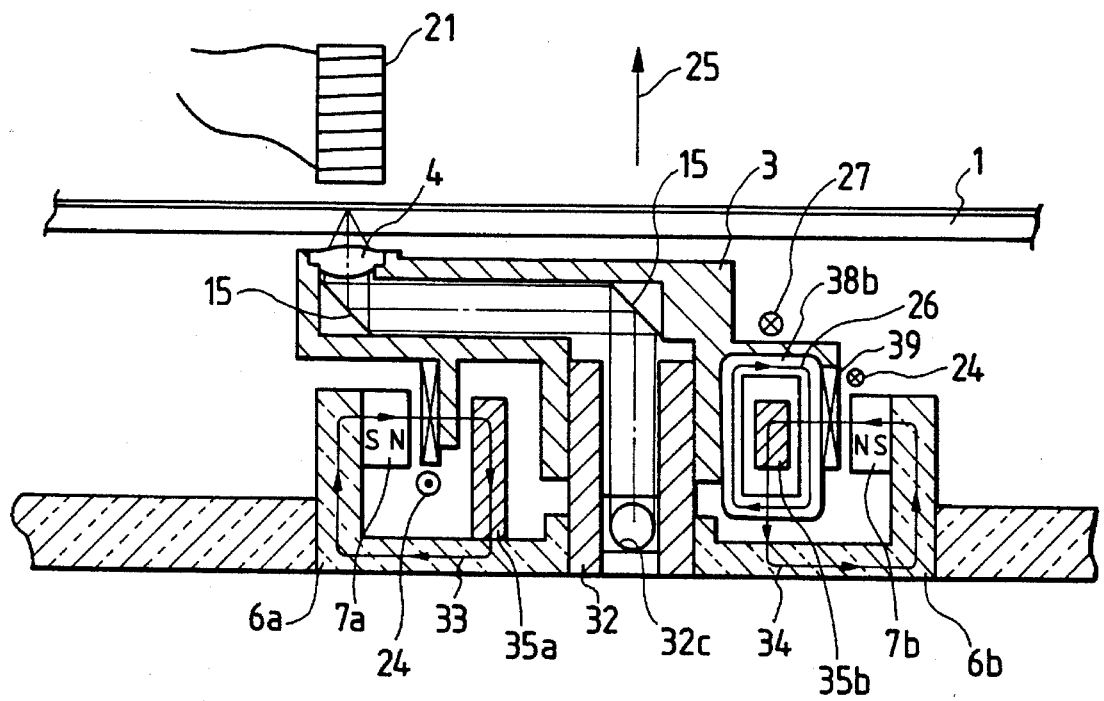
FIG. 7 is an enlarged cross-sectional view taken along line VII—VII of FIG. 6.

FIG. 7 shows a magnetic actuator for actuating the circular support 3 and hence the condensing lens 4, the magnetic actuator being composed of the focusing coil 39, the central yoke members 35a, 35b, the side yoke members 6a, 6b, the permanent magnet members 7a, 7b, and the tracking coil members 38a, 38b. The permanent magnet members 7a, 7b, the side yoke members 6a, 6b, and the central yoke members 35a, 35b jointly form magnetic circuits 33, 34.

When an electric current flows through the focusing coil 39 in the direction indicated by the arrow 24 oriented perpendicularly to the sheet of FIG. 7 toward the observer of FIG. 7, the focusing coil 39 is subjected to a force produced in the direction indicated by the arrow 25 for focusing control. Therefore, the condensing lens 4 is moved toward the optical disk 1 for thereby focusing the laser beam applied therefrom onto the recording layer of the optical disk 1. When an electric current flows through the tracking coil member 38b placed in the magnetic circuit 34 in the direction indicated by the arrow 26, the tracking coil member 38b is subjected to a force produced in the direction indicated by the arrow 27 oriented perpendicularly to the sheet of FIG. 7 away from the observer of FIG. 7. The tracking coil member 38a (not shown in FIG. 7) that is also supplied with the electric current is subjected to a force produced in the direction oriented perpendicularly to the sheet of FIG. 7 toward the observer of FIG. 7. The condensing lens 4 is therefore angularly moved about the axis Z to access a desire track on the recording layer of the optical disk 1.

Figure 8:
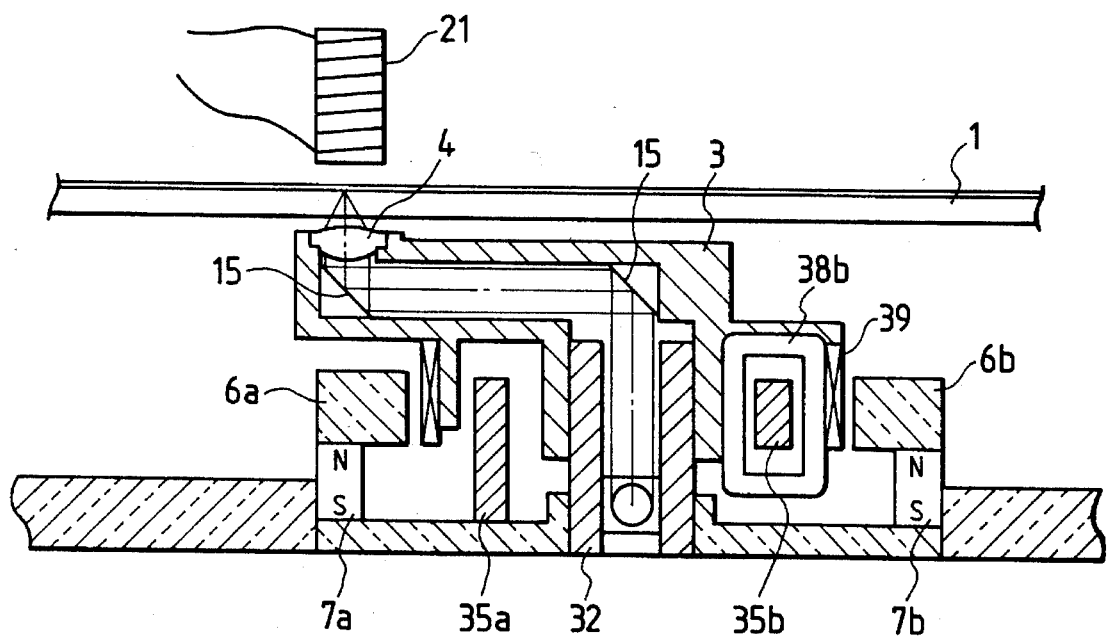
FIG. 8 is an enlarged cross-sectional view of a modification of the optical disk device shown in FIG. 8.
Figure 9:
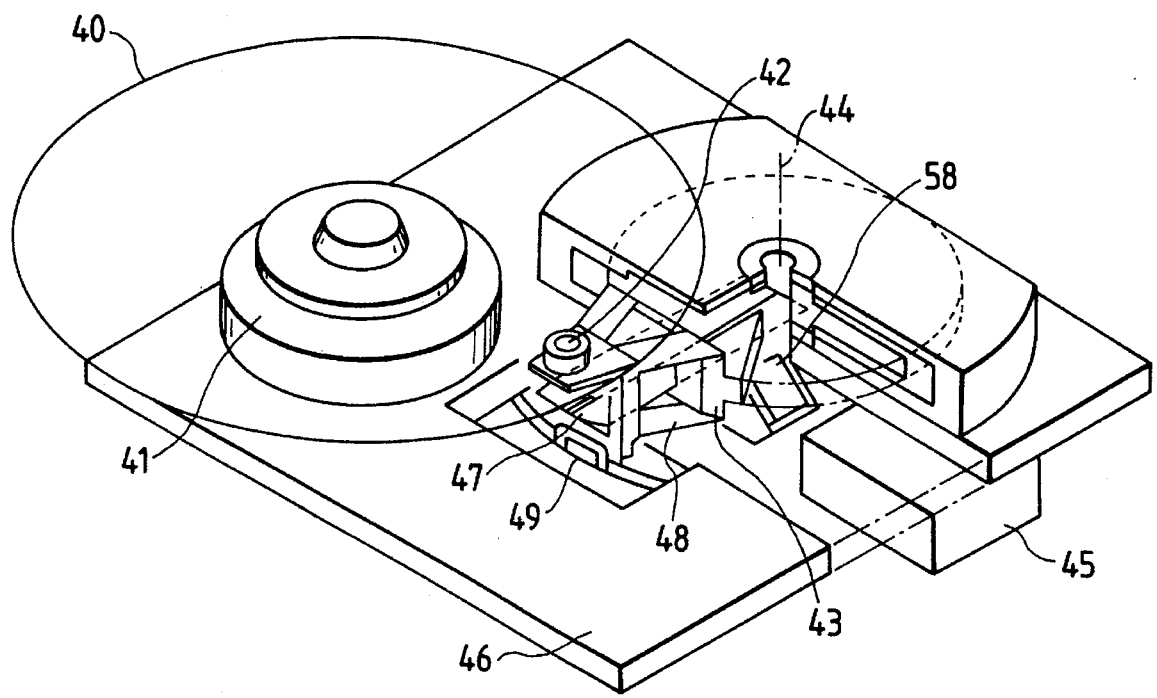
FIG. 9 is a perspective view of a conventional optical disk device.
Figure 10:
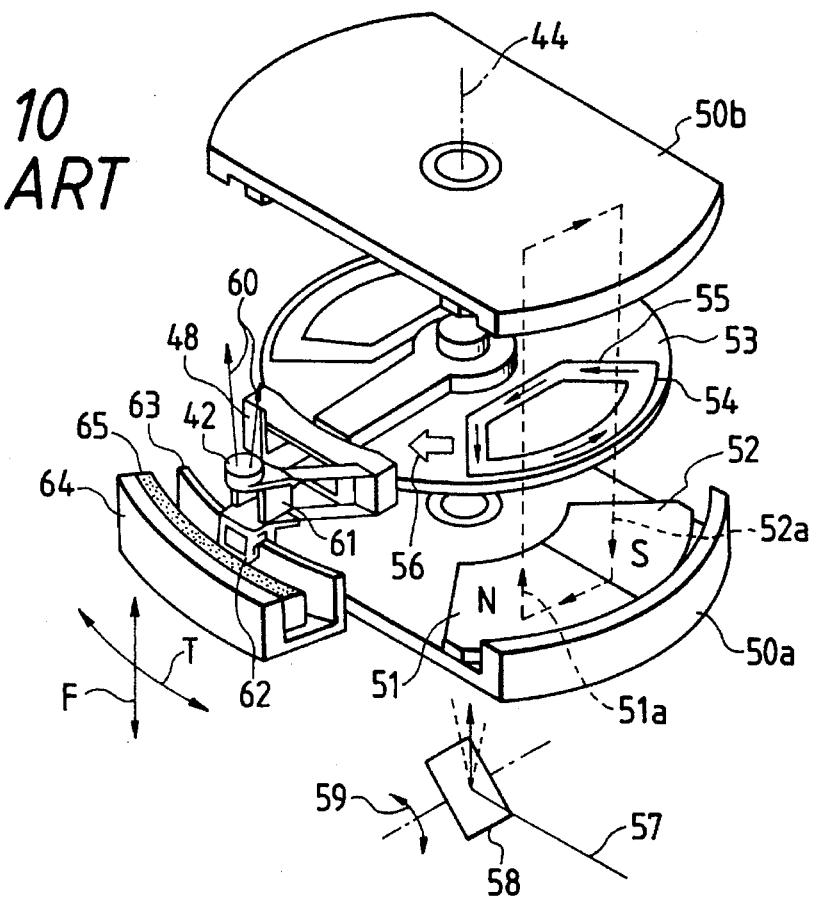
FIG. 10 is an exploded perspective view of a swing arm of the conventional optical disk device shown in FIG. 9.
Figure 11:
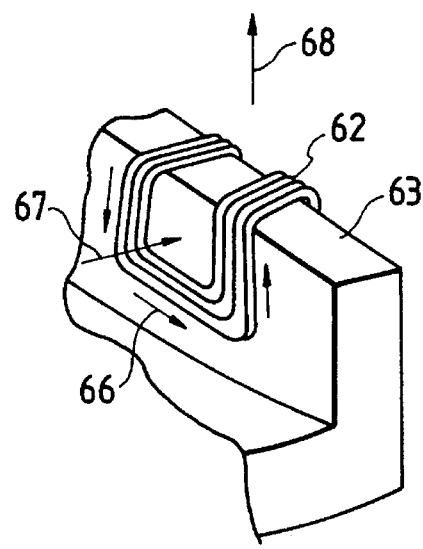
FIG. 11 is an enlarged fragmentary perspective view of a focusing actuator.
Figure 12:
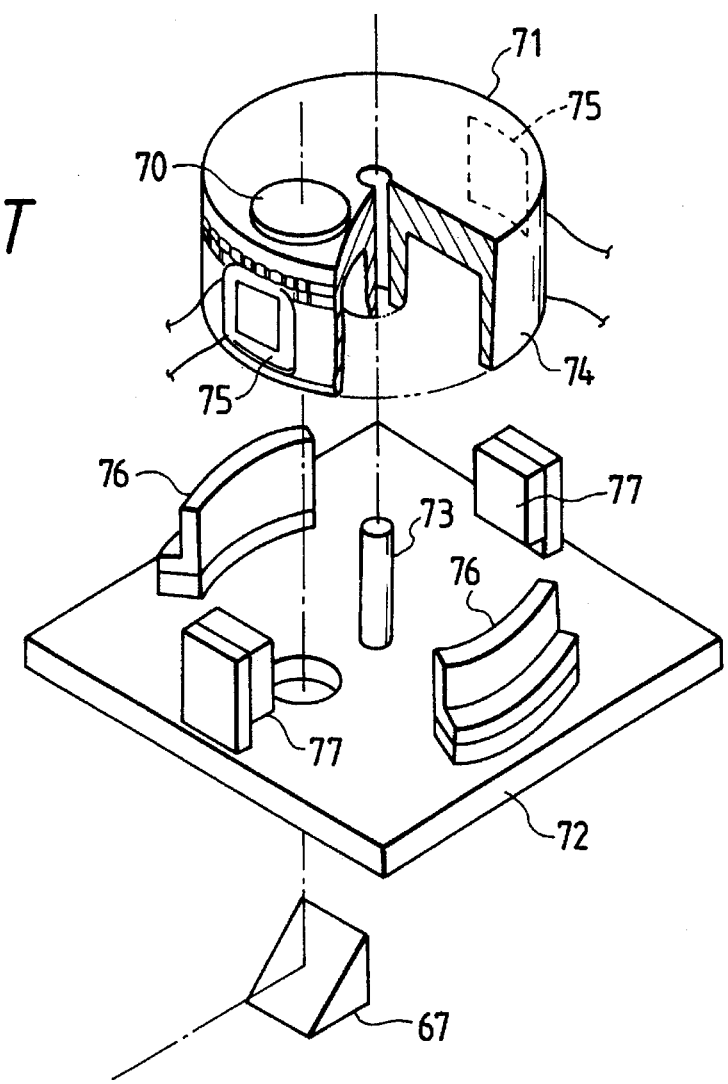
FIG. 12 is an exploded perspective view of focusing and tracking actuator of another conventional optical disk device.

In FIG. 7, the side yoke members 6a, 6b are supported on a device housing with the permanent magnet members 7a, 7b attached to the respective side yoke members 6a, 6b, and the central yoke members 35a, 35b are positioned in the tracking coil members 38a, 38b, respectively. FIG. 8 shows a modification in which the permanent magnet members 7a, 7b are supported on a device housing, and the permanent magnet members 7a, 7b, the central yoke members 35a, 35b, and the side yoke members 6a, 6b jointly form magnetic circuits in which the tracking coil members 38a, 38b and the focusing coil 39 are positioned. Alternatively, the permanent magnet members 7a, 7b may be mounted on the central yoke members 35a, 35b, respectively, and they may be positioned in the tracking coil 39.

In the above embodiments, the circular support 3 is axially moved along the hollow shaft 2 or 32 for focusing control, and angularly moved around the hollow shaft 2 or 32 for tracking control between the innermost and outermost tracks 1a, 1b on the optical disk 1. This arrangement makes the optical disk device and hence a control circuit therefor relatively simple in structure. The circular support 3 is reduced in size and weight for a smaller moment of inertia, with the condensing lens 4 positioned relatively closely to the axis Z, thereby permitting the condensing lens 4 to access a desired track at high speed between the innermost and outermost tracks 1a, 1b. Accordingly, the track access time of the optical disk device is reduced.

Since rough and fine track access control processes can be performed with one axially and angularly movable support and one magnetic actuator, the mechanism of the optical disk device and the control circuit therefor are highly simplified.

The hollow shaft 2 shown in FIG. 1 serves as part of the magnetic circuits. Consequently, the magnetic actuator is integrated, resulting in a reduction in the moment of inertia of the movable components of the magnetic actuator.

The circular support 2 is angularly movable about the hollow shaft 2 or 32 freely in a desired angular range without limitations.

The Z-axis of the circular support 2 is positioned substantially intermediate between the innermost and outermost tracks 1a, 1b of the optical disk 1, and the angular range in which the circular support 2 is angularly movable is located within the projected area of the optical disk 1 as viewed along the Z-axis. Accordingly, the optical disk device is highly compact in size.

Inasmuch as the axially and angularly movable circular support 2 is small in size and weight, the amount of electric energy required to actuate the support 2 is relatively small. Because of the reduced power requirement, the optical disk device may be battery-powered and may be implemented as a portable optical disk device.

The optical disk device has been shown and described as being a magneto-optic disk device. However, the principles of the present invention may be incorporated in any of other optical disk devices such as a compact disc player or a laser video disc player.

Although certain preferred embodiments of the present invention have been shown and described in detail, it should be understood that various changes and modifications may be made therein without departing from the scope of the appended claims.

We claim as our invention:

1. An optical disk device for reading or recording information from/in an optical disk in which the information is stored between an innermost track and an outermost track, comprising:

a shaft positioned just under a middle point between the innermost and outermost tracks of the optical disk;

a support mounted on said shaft for axial movement along said shaft and angular movement around said shaft, the support being located within a projected area of the optical disk;

condensing means for converging a light beam onto the optical disk, said condensing means being supported on said support off said shaft by half of a distance between the innermost and outermost tracks to be moved between the innermost and outermost tracks of the optical disk by the angular movement of the circular support;

a substantially cylindrical central yoke disposed concentrically around said shaft;

a substantially cylindrical side yoke comprising a pair of arcuate side yoke members, the arcuate side yoke members being disposed concentrically around said cylindrical central yoke;

a substantially cylindrical magnet comprising a pair of arcuate magnets coupled to said arcuate side yoke members, said arcuate magnets, said central yoke, and said arcuate side yoke members coacting to provide a magnetic circuit which is located within a projected area of the optical disk;

a focusing coil mounted on said support and disposed between said cylindrical yoke and said arcuate side yoke members to axially move said support along said shaft in a magnetically coacting relationship with respect to said magnetic circuit; and a tracking coil mounted of said support, said cylindrical central yoke-penetrating through an opening of said tracking coil to angularly move said support around said shaft in a magnetically coacting relationship with respect to said magnetic circuit, and said tracking coil being angularly moved along said cylindrical central yoke while directing a central axis of said tracking coil in a tangent line of a circle around said shaft.

2. An optical disk device according to claim 1, wherein:

said shaft comprises a hollow shaft defining therein a light path for the light beam, said hollow shaft having an aperture defined therein, a gap being defined between said arcuate side yoke members, said aperture and said gap being held in optical communication with said light path to pass the light beam in parallel to a plane of the optical disk in the light path between said aperture and said gap.

3. An optical disk device according to claim 1, wherein:

said shaft is made of ferromagnetic material to provide said magnetic circuit formed of said shaft, said arcuate magnets, said central yoke, and said arcuate side yoke members.

4. An optical disk device, comprising:

a shaft of a ferromagnetic material;

a support mounted on said shaft for axial movement along said shaft and angular movement around said shaft;

condensing means for converging a light beam onto an optical disk mounted in position, said condensing means being supported on said support off said shaft, information being stored between an innermost track and an outermost track of the optical disk, said support and said magnetic circuit being located within a projected area of the optical disk mounted in position, said shaft being positioned just under a middle point between the innermost and outermost tracks of the optical disk, and a first distance between said condensing means and said shaft being half of a second distance between the innermost and outermost tracks to angularly move the condensing means between the innermost and outermost tracks of the optical disk;

a substantially cylindrical side yoke disposed concentrically around said shaft;

a substantially cylindrical magnet coupled to said side yoke to form a magnetic circuit composed of said shaft of said ferromagnetic material, said substantially cylindrical magnet and said side yoke, said support and said magnetic circuit being located within a projected area of the optical disk mounted in position;

a cylindrical focusing coil mounted on said support and disposed between said shaft and said side yoke to axially move said support along said shaft in a magnetically coacting relationship with respect to said magnetic circuit; and a tracking coil mounted on said support, said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

5. An optical disk device, comprising:

a shaft of a ferromagnetic material, said shaft comprising a hollow shaft in which a light path for a light beam is defined, and said hollow shaft having an aperture defined therein;

a support mounted on said shaft for axial movement along said shaft and angular movement around said shaft;

condensing means for converging the light beam onto an optical disk mounted in position, said condensing means being supported on said support off said shaft;

a substantially cylindrical side yoke disposed concentrically around said shaft, said substantially cylindrical side yoke having a gap defined therein, and said aperture and said gap being held in optical communication with said light path to pass the light beam in parallel to a plane of the optical disk in the light path between said aperture and said gap;

a substantially cylindrical magnet coupled to said side yoke to form a magnetic circuit composed of said shaft of said ferromagnetic material, said substantially cylindrical magnet and said side yoke;

a cylindrical focusing coil mounted on said support and disposed between said shaft and said side yoke to axially move said support along said shaft in a magnetically coacting relationship with respect to said magnetic circuit; and a tracking coil mounted on said support, said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

6. An optical disk device for accessing an optical disk having a large number of tracks between an innermost track and an outermost track of the optical disk, comprising:

a shaft positioned just under a middle point between the innermost and outermost tracks of the optical disk;

a circular support mounted on said shaft for axial movement along said shaft and angular movement around said shaft, a diameter of said circular support being smaller than a radius of the optical disk to position said circular support within a projected area of the optical disk;

a projecting portion integrally formed with said circular support, the projecting portion outwardly extending in a radius direction of the circular support by half of a distance between the innermost and outermost tracks;

condensing means for converging a light beam onto the optical disk, said condensing means being supported on an end of the projecting portions, and said condensing means being moved between the innermost and outermost tracks of the optical disk by the angular movement of the circular support;

a substantially cylindrical side yoke disposed concentrically around said shaft, a diameter of said cylindrical side yoke being smaller than the radius of the optical disk to position said cylindrical side yoke within the projected area of the optical disk;

a substantially cylindrical magnet coupled to said side yoke, said magnet and said side yoke coacting to provide a magnetic circuit; and a tracking coil mounted on said circular support, said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

7. An optical disk device according to claim 6, wherein: said shaft is made of ferromagnetic material to provide said magnetic circuit formed of said shaft, said magnet, and said side yoke.

8. An optical disk device according to claim 6, wherein: said magnet also extends through said tracking coil.

9. An optical disk device according to claim 6, wherein: said shaft comprises a hollow shaft defining therein a light path for the light beam, said hollow shaft having an aperture defined therein, said side yoke having a gap defined therein, said cylindrical magnet having a gap defined between said arcuate magnets, and said aperture and said gaps being held in optical communication with said light path to pass the light beam in parallel to a plane of the optical disk in the light path between said aperture and said gap.

10. An optical disk device, comprising:

a shaft of a ferromagnetic material;

a support mounted on said shaft for angular movement along said shaft;

condensing means for converging a light beam onto an optical disk mounted in position, said condensing means being supported on said support off said shaft, information being stored between an innermost track and an outermost track of the optical disk, said shaft being positioned just under a middle point between the innermost and outermost tracks of the optical disk, and a first distance between said condensing means and said shaft being half of a second distance between the innermost and outermost tracks to angularly move the condensing means between the innermost and outermost tracks of the optical disk;

a substantially cylindrical side yoke disposed concentrically around said shaft;

a substantially cylindrical magnet coupled to said side yoke to form a magnetic circuit composed of said shaft of said ferromagnetic material, said cylindrical magnet and said side yoke, said support and said magnetic circuit being located within a projected area of the optical disk mounted in position; and a tracking coil mounted on said support, said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

11. An optical disk device, comprising:

a shaft of a ferromagnetic material, said shaft comprising a hollow shaft in which a light path for a light beam is defined, and said hollow shaft having an aperture defined therein;

a support mounted on said shaft for angular movement along said shaft;

condensing means for converging a light beam onto an optical disk mounted in position, said condensing means being supported on said support off said shaft;

a substantially cylindrical side yoke disposed concentrically around said shaft, said substantially cylindrical side yoke having a first gap defined therein;

a substantially cylindrical magnet coupled to said side yoke to form a magnetic circuit composed of said shaft of said ferromagnetic material, said cylindrical magnet and said side yoke, said cylindrical magnet having second a gap defined between said arcuate magnets, and said aperture and said first and second gaps being held in optical communication with said light path to pass the light beam in parallel to a plane of the optical disk in the light path placed in said aperture and said first and second gaps; and a tracking coil mounted on said support, said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

12. An optical disk device, comprising:

a shaft;

a support mounted on said shaft for axial movement along said shaft and angular movement around said shaft;

condensing means for converging a light beam onto an optical disk mounted in position, said condensing means being supported on said support off said shaft, information being stored between an innermost track and an outermost track of the optical disk, said shaft being positioned just under a middle point between the innermost and outermost tracks of the optical disk, and a first distance between said condensing means and said shaft being half of a second distance between the innermost and outermost tracks to angularly move the condensing means between the innermost and outermost tracks of the optical disk;

a substantially cylindrical side yoke disposed concentrically around said shaft;

a substantially cylindrical magnet coupled to said side yoke, said magnet and said side yoke coacting to provide a magnetic circuit, said support and said magnetic circuit being located within a projected area of the optical disk mounted in position;

a cylindrical focusing coil mounted on said support and disposed between said shaft and said side yoke to axially move said support along said shaft in a magnetically coacting relationship with respect to said magnetic circuit; and a tracking coil mounted on said support and disposed outside said cylindrical focusing coil to be distant from said support, said magnet and said side yoke penetrating through an opening of said tracking coil to angularly move said support around said shaft in a magnetically coacting relationship, with respect to said magnetic circuit, and said tracking coil being angularly moved along said side yoke while directing a central axis of said tracking coil in a tangent line of a circle around said shaft.

13. An optical disk device, comprising:

a shaft comprising a hollow shaft in which a light path for a light beam is defined, said hollow shaft having an aperture defined therein;

a support mounted on said shaft for axial movement along said shaft and angular movement around said shaft;

condensing means for converging a light beam onto an optical disk mounted in position, said condensing means being supported on said support off said shaft;

a substantially cylindrical side yoke disposed concentrically around said shaft said side yoke having a first gap defined therein;

a substantially cylindrical magnet coupled to said side yoke, said magnet and said side yoke coacting to provide a magnetic circuit, said cylindrical magnet having a second gap defined between said arcuate magnets, and said aperture and said first and second gaps being held in optical communication with said light path to pass the light beam in parallel to a plane of the optical disk in the light path placed in said aperture and said first and second gaps;

a cylindrical focusing coil mounted on said support and disposed between said shaft and said side yoke to axially move said support along said shaft in a magnetically coacting relationship with respect to said magnetic circuit; and a tracking coil mounted on said support and disposed outside said cylindrical focusing coil to be distant from said support, said magnet and said side yoke penetrating through an opening of said tracking coil to angularly move said support around said shaft in a magnetically coacting relationship with respect to said magnetic circuit, and said tracking coil being angularly moved along said side yoke while directing a central axis of said tracking coil in a tangent line of a circle around said shaft.

* * * * *

UNITED STATES PATENT AND TRADEMARK OFFICE
CERTIFICATE OF CORRECTION

PATENT NO. : 5,465,242
DATED : November 7, 1995
INVENTOR(S) : Yuji Terashima et al.

It is certified that error appears in the above-indentified patent and that said Letters Patent is hereby corrected as shown below:

On the title page, item [75] should read as follows:

--[75] Inventors: Yuji Terashima; Shogo Horinouchi; Hiroyuki Matsuba, all of Fukuoka, Japan--

Signed and Sealed this

Thirteenth Day of February, 1996

Attest:

BRUCE LEHMAN

Attesting Officer    Commissioner of Patents and Trademarks